(12) United States Patent
Rousseau et al.

(10) Patent No.: US 8,794,327 B2
(45) Date of Patent: Aug. 5, 2014

(54) ENHANCED OIL RECOVERY METHOD USING ASSOCIATIVE POLYMERS

(75) Inventors: David Rousseau, Nanterre (FR); René Tabary, Saint German en Laye (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 781 days.

(21) Appl. No.: 13/000,448

(22) PCT Filed: Jun. 10, 2009

(86) PCT No.: PCT/FR2009/000690
§ 371 (c)(1),
(2), (4) Date: Mar. 24, 2011

(87) PCT Pub. No.: WO2010/007222
PCT Pub. Date: Jan. 21, 2010

(65) Prior Publication Data
US 2011/0180255 A1     Jul. 28, 2011

(30) Foreign Application Priority Data

Jun. 24, 2008   (FR) ..................................... 08 03534

(51) Int. Cl.
*E21B 43/27*     (2006.01)
*E21B 43/26*     (2006.01)

(52) U.S. Cl.
USPC ....................................... 166/300; 166/305.1

(58) Field of Classification Search
None
See application file for complete search history.

(56) References Cited

U.S. PATENT DOCUMENTS

| | | |
|---|---|---|
| 4,432,881 A | 2/1984 | Evani |
| 4,476,169 A | 10/1984 | Nishino et al. |
| 4,529,523 A | 7/1985 | Landoll |
| 4,638,865 A | 1/1987 | Ball et al. |
| 4,702,319 A | 10/1987 | Bock et al. |
| 4,709,759 A | 12/1987 | Bock et al. |
| 4,780,517 A | 10/1988 | Ching |
| 4,814,096 A | 3/1989 | Evani |
| 4,852,652 A | 8/1989 | Kuehne |
| 4,861,499 A | 8/1989 | Neff et al. |
| 6,364,016 B1 * | 4/2002 | Dalrymple et al. ........... 166/270 |

FOREIGN PATENT DOCUMENTS

WO      WO 85/03510      8/1985

OTHER PUBLICATIONS

T. Aubry et al., Hydrophobically Associating Polymers as Rheology Modifiers, Revue De L'Institut Francais Du Petrole, Mar. 1, 1997, vol. 52, No. 2.

* cited by examiner

*Primary Examiner* — Angela M DiTrani
(74) *Attorney, Agent, or Firm* — Antonelli, Terry, Stout & Kraus, LLP.

(57) ABSTRACT

An enhanced oil recovery method using injection of aqueous polymer solutions into the reservoir rock, includes the stages of: injecting a first aqueous solution of non-associative hydrophilic polymers into the reservoir in a predetermined proportion so that they adsorb on the reservoir rock; and then injecting a second aqueous solution of associative polymers into the reservoir for oil recovery, with limited adsorption considering the adsorption of the non-associative polymers of the first solution.

17 Claims, 1 Drawing Sheet

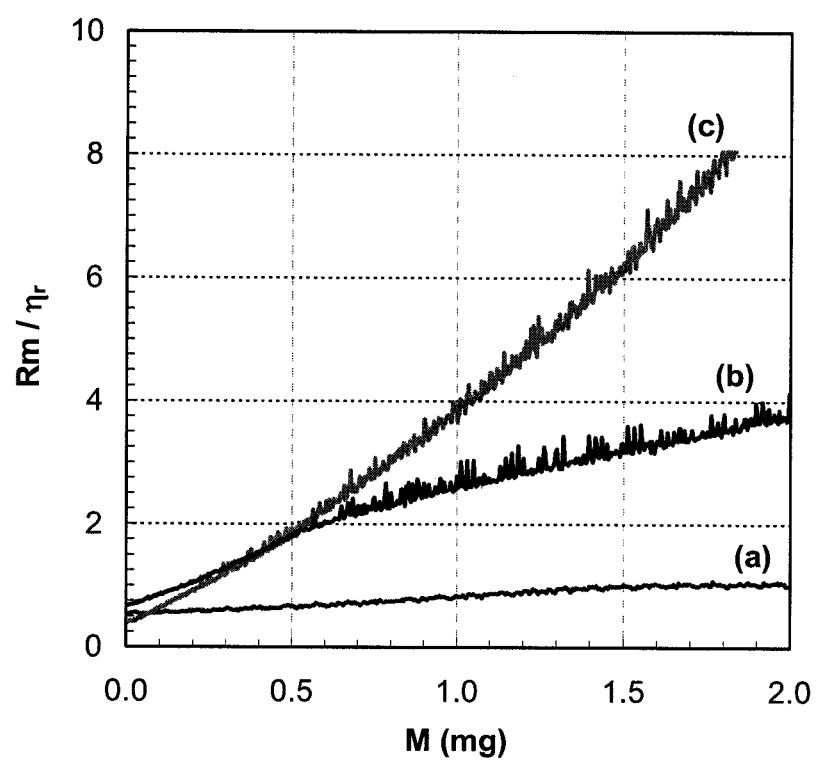

ENHANCED OIL RECOVERY METHOD USING ASSOCIATIVE POLYMERS

FIELD OF THE INVENTION

The invention relates to the field of use of hydrosoluble polymers referred to as hydrophobically associative polymers, in order to improve the rate of recovery of the hydrocarbons contained in porous rocks of the subsoil. In particular, the present invention provides a method for optimizing these operations while limiting the adsorption of these polymers on the porous rocks.

When reservoir development is started, the natural pressure of the hydrocarbons is sufficient to ensure their displacement towards the wells. However, this pressure decreases during production and, when it has become too low, techniques referred to as secondary recovery techniques have to be implemented. The basic secondary recovery technique consists in injecting an aqueous phase into the underground reservoir through wells referred to as injector wells, located at a distance from the producer wells. The aqueous phase injected first allows to maintain the pressure in the reservoir, then, when it comes into contact with the hydrocarbons, to displace them towards the production wells.

The amount of hydrocarbons that can be recovered within the context of secondary recovery is notably limited by the sweep efficiency. The sweep efficiency is linked with the permeability contrasts that exist in the reservoir and with the viscosity difference between the aqueous phase and the oil phase.

In order to improve the sweep efficiency, chemical enhanced oil recovery (EOR) techniques have been proposed. Some notably consist in increasing the viscosity of the aqueous phase injected by adding hydrosoluble polymers thereto. The viscosity increase is translated into a reduction of the mobility ratio between the aqueous phase and the hydrocarbon phase. This therefore allows both to improve the vertical sweep profiles and to reduce the viscous fingering effects. In this context, the polymers are referred to as <<mobility control agents>>.

BACKGROUND OF THE INVENTION

Using hydrophobically associative polymers (HAP) to improve the sweep efficiency has been proposed as soon as the early 1980s (U.S. Pat. Nos. 4,529,523, 4,432,881, 4,814,096, WO85/03510, U.S. Pat. Nos. 4,702,319, 4,709,759, 4,638,865, 4,780,517, 4,852,652, 4,861,499, 4,476,169).

HAPs are polymers whose skeleton is hydrophilic, but which comprise along the chains small amounts (some percents by mole) of hydrophobic monomers likely to combine in water in form of hydrophobic nanodomains, also referred to as <<hydrophobic links>>. The latter act as temporary reticulation points and they confer very interesting properties on HAPs, notably as regards their rheology. Their viscosities in concentrated regime are also significantly higher with low shear gradients than those of equivalent non-associative polymer solutions at the same concentration. This major property allows to consider much more favourable (i.e. lower) mobility ratios than with conventional polymers at the same concentrations, and thus to provide a higher sweep efficiency. Furthermore, since the reticulation points between the HAP chains involve low energies, they can be reversibly broken under the effect of shearing. The HAP solutions thus have a clearly more marked shear-thinning character than equivalent non-associative polymer solutions, which favours their injectivity in wells. Finally, in general terms, high viscosities with low gradients are obtained with markedly shorter HAP chains than the conventional polymer chains commonly used in tertiary recovery. The HAP solutions therefore intrinsically have a higher mechanical degradation strength than conventional polymer solutions.

Several experimental studies have been carried out to evaluate the performances of HAPs for EOR applications (Taylor, K. C., Nasr-el-Din, H. A.: "Water-soluble hydrophobically associating polymers for improved oil recovery" *Journal of Physical Chemistry B*, 19, 265-280 (1998)). However, a specific feature of the use of HAPs for this type of application is the <<abnormal>> behaviour thereof in terms of adsorption on surfaces: unlike conventional polymers, the HAP adsorption isotherms do not tend towards a plateau when the polymer concentration increases (Volpert, E., Seib, J., Candau, F., Green, N., Argillier, J. F., Bai, B., Audibert, A.: "Adsorption of Hydrophobically Associating Polyacrylamides on Clay" *Langmuir*, 14, 1870-1879 (1998)). This abnormally high adsorption has proved beneficial for well treatment applications of water inflow prevention and profile control type (U.S. Pat. Nos. 4,476,169, 6,364,016).

According to studies on HAP adsorption (Volpert, E., Selb, J., Candau, F., Green, N., Argillier, J. F., Bai, B., Audibert, A.: "Adsorption of Hydrophobically Associating Polyacrylamides on Clay". *Langmuir*, 14, 1870-1879 (1998)), their particular adsorption on surfaces in relation to that of non-associative polymers results from the formation of hydrophobic links between the successive adsorbed chain layers. Thus, a first adsorbed HAP layer forms, as in the case of non-associative polymers, i.e. notably by means of Van der Waals type bonds with the surface. Additional HAP chains then bind with those of the first layer without being in contact with the surface. They form hydrophobic links with the hydrophobic groups of the already adsorbed chains. HAP multilayers can thus form, which explains the higher adsorption of HAP in relation to that of the conventional non-associative hydrosoluble polymers. This mechanism is pertinent for static adsorption on surfaces (powders, etc.) as well as adsorption at the surface of pores or pore thresholds in porous media, such as reservoir rocks.

Document U.S. Pat. No. 6,364,016 by Dalrymple et al. describes a method that consists in improving the propagation in depth of polymers intended to reduce the water permeability in the well vicinity by injecting beforehand small molecules that will temporarily occupy the adsorption sites available on the surface of the pores in the immediate vicinity of the well. The polymers injected thereafter will first propagate beyond the zone treated by the small molecules and adsorb further away, where adsorption sites still are available. Then, they progressively replace the small molecules in the well vicinity so as to finalize the water inflow control process. This is a conventional effect of desorption of the small molecules in favour of the near-irreversible adsorption of the polymers of higher molar mass. This method cannot be suitable for EOR applications by HAP injection. In fact, in EOR, the polymers have to be injected over long periods of time and propagate on the reservoir scale so as to sweep the hydrocarbons, which is incompatible with desorption in favour of another adsorption.

In EOR, a strong adsorption is not acceptable. It can in fact first severely penalize the injectivity and depth propagation of the HAPs. Furthermore, it is unfavourable from an economic point of view since the material adsorbed no longer contributes to the viscosity of the aqueous phase, which increases the mobility ratio.

A method allowing to minimize HAP adsorption in porous media therefore is clearly of great significance for EOR applications.

According to the invention, it appears that HAP multilayer adsorption can be controlled and avoided by preventing the formation of a first adsorbed layer of HAP.

DETAILED DESCRIPTION

The present invention thus relates to an enhanced oil recovery method using injection of aqueous polymer solutions into the reservoir rock, characterized in that the following stages are carried out:
injecting a first aqueous solution of non-associative hydrophilic polymers into the reservoir in a predetermined proportion so that they adsorb on the reservoir rock,
injecting a second aqueous solution of associative polymers into the reservoir for oil recovery, with limited adsorption considering the adsorption of the non-associative polymers of the first solution.

The non-associative polymers of the first layer can have a molar mass ranging between $20.10^3$ and $40.10^6$ g/mol, and the associative polymers of said second layer can have a molar mass ranging between $20.10^3$ and $20.10^6$ g/mol.

Said non-associative polymers can be equivalent to the hydrophilic chain of the associative polymers.

The molar fractions of the hydrophobic parts of said associative polymers can range between 0.05% and 10%, preferably between 0.1% and 3%.

The method proposed within the scope of this invention consists in creating, prior to HAP injection, a first adsorbed layer of non-associative polymers, injected as sacrificial agents. This operation allows to prevent quasi-permanently adsorption of the HAPs injected thereafter as mobility control agents. The non-associative polymers tend in fact to occupy all the sites at the surface of the pores, which makes the creation of a first adsorbed HAP layer, and therefore the formation of multilayers by means of hydrophobic links, impossible. <<Protection>> of the surface by the non-associative polymers is furthermore near-permanent insofar as the adsorption of polymers tends to be irreversible due to the existence of several polymer/surface links per chain.

In order to provide optimum efficiency for the method proposed, the non-associative polymers can preferably be chemically comparable to the hydrophilic part of the HAPs.

The reservoir conditions under which the method proposed can be applied are any conditions. They include in particular temperatures up to 300° C. and pressures up to 1000 bars. The rock facies are also any facies. They notably comprise sandstone type rocks and carbonate type rocks.

The injection conditions are an essential parameter to ensure the success of an EOR operation using the method proposed. It is in fact essential for the non-associative polymers to be injected at a sufficient concentration and over a sufficient period of time so that, in the reservoir, they always come into contact with the surface of the rock matrix before the HAPs.

The invention relates to HAPs in the broad sense, which can consist of a large variety of hydrophilic monomers and hydrophobic monomers, and which can be prepared using different methods.

Examples of synthesis methods are post-modification, which consists in grafting hydrophobic groups on pre-existing hydrophilic polymer chains (Feng, Y., Billon, L., Grassi, B., Khoukh, A., Francois, J.: "Hydrophobically associating polyacrylamides and their partially hydrolyzed derivatives prepared by post-modification." 1. Synthesis and characterization. *Polymer,* 43-7, 2055-2064 (2002)), and micellar copolymerization, which consists in simultaneously polymerizing in aqueous solution the hydrophilic monomers and the hydrophobic monomers, the latter being solubilized in micelles (Bastiat, G., Grassi, B., Francois, J.: "Micellar copolymerization of associative polymers: Study of the effect of acrylamide on sodium dodecyl sulfate-poly(propylene oxide) methacrylate mixed micelles". *Journal of Colloid and Interface Science,* 289, 359-370 (2005)).

The molar mass of the HAPs can range between approximately $20.10^3$ and approximately $20.10^6$ g/mol. The chains consist of one or more hydrophilic monomer types and of one or more hydrophobic monomer types. The total molar fractions of hydrophobic monomers can range between approximately 0.05% and approximately 10%, preferably between 0.1% and 3%.

A non-exhaustive list of hydrophilic monomers that can be used is given hereafter: acrylamide, methacrylamide, 2-acrylamido-2-methylpropane sulfonic acid (AMPS), acrylic acid, N,N-dimethylacrylamide, dimethylaminoethyl methacrylate (DMAEMA), dimethylaminopropyl methacrylamide, hydroxyethyl acrylate (ethylene glycol monoacrylate), vinyl pyrrolidone and trimethylammoniummethyl methacrylate chloride. In case of synthesis by post-modification, the preexisting hydrophilic chains can be of different chemical natures, including all the polymers obtained by polymerizing one or more of the aforementioned monomer types and, by way of non limitative example: polyethylene (or polyethylene glycol) oxide, cellulose ethers (such as hydroxyethylcellulose), natural polysaccharides (such as guar gums), and polyvinylic alcohol.

Examples of hydrophobic monomers that can be used include, without however being limited to the following group: alkyl acrylates, alkyl methacrylates, alkyl acrylamides, alkyl methacrylamides, alkyl dimethylammoniumethyl methacrylate bromides, alkyl dimethylammoniumethyl methacrylate chlorides, alkyl dimethyl-ammoniumethyl methacrylate iodides, alkyl dimethylammoniumpropyl methacryl-amide bromides, alkyl dimethylammoniumpropyl methacrylamide chlorides and alkyl dimethylammoniumpropyl methacrylamide iodides. The alkyl chains can be branched or not, and comprise between approximately 4 and 25 carbon atoms.

The non-associative hydrophilic polymers used within the scope of this invention can have a molar mass ranging between approximately $20.10^3$ and approximately $40.10^6$ g/mol. These non-associative polymers can have any composition. It can notably be identical to that of the hydrophilic part of the HAPs. They can thus, without this being limitative, correspond to the list of examples of composition given above for HAPs.

The HAPs and the non-associative polymers can be brought into solution in waters containing dissolved salts. The concentration of these salts can range from 0 g/L to saturation, i.e. for example 359 g/L for NaCl at 25° C. The pH value of the aqueous solutions of HAP or non-associative polymers can range between 3 and 12.

The example presented below shows the positive effect of the prior injection in porous media of non-associative polymers on the adsorption of HAPs.

The experiments described in this example were conducted with HAPs prepared by micellar copolymerization and with non-associative polymers, referred to as equivalent, because prepared according to the same procedure, but without adding, upon synthesis, hydrophobic monomers to the reaction mixture. The polymers are polyacrylamides comprising 20% in molar fraction of AMPS groups and, for the HAPs, 1% in molar fraction of alkyl acrylamide with 12 carbon atoms. The HAPs are denoted by SPAM-C12 and the equivalent non-associative polymers by SPAM. The molar mass of the SPAM-C12 and of the SPAM is close to $M_w=7.10^5$ g/mol with a polydispersity index $I_p=2$. The solutions of the two polymer types were prepared in a brine made up of Milli-Q® ultrapure water with 1 g/L NaCl and 0.4 g/L NaN$_3$, used as a bactericide.

EXPERIMENTAL PROCEDURE

The experiments were carried out in model porous media consisting of sharp-edged silicon carbide (SIC) grains, which afford the advantage of having highly reproducible petrophysical properties, notably pore structures, from one porous medium to the next. Hydrosoluble polymer adsorption on SIC has besides been widely studied in the past (see Zitha et al. for example). Pressure detectors allow to measure the pressure drops ($\Delta P$) during fluid flows in porous media. The porous media used are 10 cm long and 1.5 cm in diameter. The experiments were conducted at a temperature T=30° C. The results given in this example concern two distinct porous media, denoted by MP1 and MP2, whose permeability, porosity and mean hydrodynamic pore radius are 1100±100 mD, 40±1% and $d_h$=11±1 μm respectively.

Two relatively diluted solutions were prepared, one with SPAM, the other with SPAM-C12. Selection of the diluted solutions is justified by the fact that the experiments are only intended for studying the adsorption of polymers. The relative concentrations and viscosities of the solutions are respectively: C≈800 mg/L and $\eta_r$≈4 for SPAM and C≈400 mg/L and $\eta_r$≈2 for SPAM-C12.

Prior to any polymer injection, the porous media were saturated with brine at 1 g/L NaCl and 0.4 g/L NaN$_3$, then their permeability was measured at various flow rates, using the same brine. The porous media were then left under brine flow at a flow rate of 2 cm$^3$/h for a time corresponding to the injection of several pore volumes. The polymer solutions were injected after these preliminary stages at a flow rate of 2 cm$^3$/h.

The experiments were carried out as follows:
  for porous medium MP1, the experiment started with a first SPAM injection stage. Brine was then injected during several pore volumes so as to displace all the non-adsorbed chains, then, in a second stage, the SPAM-C12 solution was injected,
  for porous medium MP2, polymer injection consisted in a single direct injection of SPAM-C12.

The results are given in terms of mobility reduction (Rm), also referred to as resistance factor (RF), per unit of relative viscosity: Rm/$\eta_r$. The mobility reductions are calculated by dividing the pressure drops $\Delta P_{pol}$ measured during polymer injection by the pressure drops $\Delta P_{ref}$ measured during the brine reference injection. During a polymer injection, an increase in Rm results both from the viscosity increase of the liquid injected and from the permeability decrease linked with the pore size reduction caused by the adsorption of the chains. Ratio Rm/$\eta_r$ and, in particular, the fact that it stabilizes, or not, during injection thus provides qualitative information on the adsorption of polymers in porous media.

The sole figure shows the Rm/$\eta_r$ curves as a function of the mass of polymer injected (M). The curves shown correspond to the injection of SPAM into porous medium MP1 (first stage) (a), to the injection of SPAM-C12 into porous medium MP1 (second stage) (b) and to the direct injection of SPAM-C12 into porous medium MP2 (c).

In the case of direct injection of non-associative polymers SPAM (a), an increase, then a stabilization of the mobility reduction is observed, which shows a good propagation of the polymer solution. The fact that the maximum value of Rm/$\eta_r$ is greater than one indicates an adsorption stabilization. An adsorbed layer thickness calculation can be carried out using a conventional capillary model from a measurement of the permeability reduction (Rk), also referred to as residual resistance factor (RRF), performed after injection of several brine pore volumes. The layer thickness obtained by this calculation is about 0.2 μm, i.e. the order of magnitude of the molecular dimension of the polymers. The SPAMs are thus adsorbed in form of a monolayer.

In the case of direct injection of SPAM-C12 (c), it can be observed on the contrary that the mobility reduction increases without stabilizing, which is compatible with an associative polymer adsorption in form of multilayers.

In the case of SPAM-C12 injection after SPAM injection (b), it can be noted that Rm/$\eta_r$ increases clearly less markedly than in the case of direct SPAM-C12 injection. This result shows that the pre-existing adsorbed layer of non-associative polymers allows to greatly reduce the adsorption of associative polymers.

The invention claimed is:

1. An enhanced oil recovery method using injection of aqueous polymer solutions into reservoir rock, comprising the following stages:
  a) injecting a first aqueous solution of non-associative hydrophilic polymers into a reservoir in a predetermined proportion so that they adsorb on the reservoir rock, the injection of the non-associative polymer into the reservoir creating a first layer comprising the non-associative polymers, the non-associative polymers of said first layer having a molar mass ranging between $20.10^3$ and $40.10^6$ g/mol; and then
  b) injecting a second aqueous solution of associative polymers into the reservoir for oil recovery, with limited adsorption considering the adsorption of said non-associative polymers of said first solution, the injection of the associative polymers into the reservoir creating a second layer comprising the associative polymers, the associative polymers of said second layer having a molar mass ranging between $20.10^3$ and $20.10^6$ g/mol.

2. A method as claimed in claim 1, wherein said associative polymers comprise hydrophobically associative polymers, said hydrophobically associative polymers comprising a hydrophilic skeleton chain and hydrophobic monomers along the chain, and wherein said associative polymers have a molar fraction of the hydrophobic monomers between 0.05% and 10%.

3. A method as claimed in claim 1, wherein said associative polymers comprise hydrophobically associative polymers, said hydrophobically associative polymers comprising a hydrophilic skeleton chain, and wherein said non-associative polymers are identical to the hydrophilic chain of said hydrophobically associative polymers.

4. A method as claimed in claim 1, wherein at least a portion of the adsorption of said non-associative polymers of the first solution on the reservoir rock is irreversible.

5. A method as claimed in claim 4, wherein said associative polymers comprise hydrophobically associative polymers, said hydrophobically associative polymers comprising a hydrophilic skeleton chain and hydrophobic monomers along the chain.

6. A method as claimed in claim 5, wherein said non-associative polymers are identical to the hydrophilic chain of said hydrophobically associative polymers.

7. A method as claimed in claim 5, wherein said associative polymers have a molar fraction of the hydrophobic monomers between 0.05% and 10%.

8. An enhanced oil recovery method using injection of aqueous polymer solutions into reservoir rock, comprising the following stages:
   a) injecting a first aqueous solution of non-associative hydrophilic polymers into a reservoir in a predetermined proportion so that they adsorb on the reservoir rock; and then
   b) injecting into the reservoir for oil recovery a second aqueous solution of associative polymers comprising hydrophobically associative polymers having a hydrophilic skeleton chain identical to the non-associative polymers, the hydrophobically associative polymers having limited adsorption considering the adsorption of said non-associative polymers of said first solution.

9. A method as claimed in claim 8, wherein said hydrophobically associative polymers further comprise hydrophobic monomers along the chain, and wherein said associative polymers have a molar fraction of the hydrophobic monomers between 0.05% and 10%.

10. A method as claimed in claim 8, wherein at least a portion of the adsorption of said non-associative polymers of the first solution on the reservoir rock is irreversible.

11. A method as claimed in claim 10, wherein said hydrophobically associative polymers further comprise hydrophobic monomers along the chain.

12. A method as claimed in claim 11, wherein the injection of the non-associative polymers into the reservoir creates a first layer comprising the non-associative polymers, the non-associative polymers of said first layer having a molar mass ranging between $20.10^3$ and $40.10^6$ g/mol, and wherein the injection of the associative polymers into the reservoir creates a second layer comprising the associative polymers, the associative polymers of said second layer having a molar mass ranging between $20.10^3$ and $20.10^6$ g/mol.

13. A method as claimed in claim 11, wherein said associative polymers have a molar fraction of the hydrophobic monomers between 0.05% and 10%.

14. An enhanced oil recovery method using injection of aqueous polymer solutions into reservoir rock, comprising the following stages:
   a) injecting a first aqueous solution of non-associative hydrophilic polymers into a reservoir in a predetermined proportion so that they adsorb on the reservoir rock, at least a portion of the adsorption of said non-associative polymers of the first solution on the reservoir rock is irreversible; and then
   b) injecting a second aqueous solution of associative polymers into the reservoir for oil recovery, the associative polymers having limited adsorption considering the adsorption of said non-associative polymers of said first solution.

15. A method as claimed in claim 14, wherein said associative polymers comprise hydrophobically associative polymers, said hydrophobically associative polymers comprising a hydrophilic skeleton chain and hydrophobic monomers along the chain.

16. A method as claimed in claim 15, wherein said non-associative polymers are identical to the hydrophilic chain of said hydrophobically associative polymers.

17. A method as claimed in claim 15, wherein said associative polymers have a molar fraction of the hydrophobic monomers between 0.05% and 10%.

* * * * *